United States Patent [19]

Fukushima et al.

[11] Patent Number: 4,885,735
[45] Date of Patent: Dec. 5, 1989

[54] INFORMATION RECORDING AND REPRODUCING APPARATUS WITH MANAGEMENT OF DEFECTIVE SECTOR

[75] Inventors: Yoshihisa Fukushima, Osaka; Isao Satoh, Neyagawa; Makoto Ichinose, Sakai; Yuzuru Kuroki, Toyonaka; Yuuji Takagi, Neyagawa, all of Japan

[73] Assignee: Matsushita Electric Industrial Co., Ltd., Kadoma, Japan

[21] Appl. No.: 76,170

[22] PCT Filed: Oct. 27, 1986

[86] PCT No.: PCT/JP86/00539
§ 371 Date: Jun. 22, 1987
§ 102(e) Date: Jun. 22, 1987

[87] PCT Pub. No.: WO87/02818
PCT Pub. Date: May 7, 1987

[30] Foreign Application Priority Data

Oct. 28, 1985 [JP] Japan ................................ 60-241060

[51] Int. Cl.⁴ ............................................. G11B 5/012
[52] U.S. Cl. ......................................... 369/59; 369/54; 369/58; 360/49; 360/54
[58] Field of Search ..................... 369/59, 32, 54, 58; 360/48, 49, 53, 63, 39, 54, 72.2

[56] References Cited

U.S. PATENT DOCUMENTS 4,115,768  9/1978  Eggenberger et al. .
4,405,952  9/1983  Slakmon .................. 369/39
4,545,044 10/1985  Satoh et al. .
4,695,993  9/1987  Takagi et al. ............ 369/58

FOREIGN PATENT DOCUMENTS 0127311  4/1984  European Pat. Off. .
0194640  3/1986  European Pat. Off. .
55-131013 4/1982  Japan ...................... 360/49
58-203685 11/1983 Japan .
59-113509  6/1984  Japan .
60-75931   4/1985  Japan .
61-208673  9/1986  Japan .
8501380    9/1983  World Int. Prop. O. .

Primary Examiner—Vincent P. Canney
Assistant Examiner—Kevin J. Fournier
Attorney, Agent, or Firm—Stevens, Davis, Miller & Mosher

[57] ABSTRACT

An information recording and reproducing apparatus for recording and reproducing information on and from a disk type information recording medium, wherein the information recording medium is used in which normal sectors (s1, Sn) each having an address formatted on an address area 12 in a sector ID field 9 and an alternative sector R1 having an address not yet recorded thereon are included on a same track. When a defective sector S3 is detected, first, the address of the defective sector is disabled to be reproduced by recording a delete signal 109 on the address area 12 of the defective sector S3, and at the same time, the address of the defective sector is recorded on an address area 13 in the unused alternative sector R1 located on the same track as the defective sector S3, and then, the data to be recorded on the defective sector is recorded within the alternative sector R1. Owing to such an operation for using an alternative sector, the alternative sector having the same address and data as the defective sector is formed on the same track as the defective sector. As a result, an information recording and reproducing apparatus which enables to access the alternative sector without an additional seek operation at the time of reproduction is provided.

2 Claims, 4 Drawing Sheets

INFORMATION RECORDING AND REPRODUCING APPARATUS WITH MANAGEMENT OF DEFECTIVE SECTOR

TECHNICAL FIELD

The present invention relates to an information recording and reproducing apparatus for recording and reproducing information on and from a disk type information recording medium having a plurality of sectors.

BACKGROUND ART

Information recording and reproducing systems for recording and reproducing information on and from a disk type information recording medium for each of sectors thereof are known. For example, in U.S. Pat. No. 4,545,044, there is, disclosed an information recording and reproducing system which uses an optical disk.

The optical disk is usually provided with a guide track which is detectable optically in order to form tracks with a higher density, and by irradiating a recording layer formed on the guide track with a laser light converged to about 1 $\mu$m, a hole is formed or reflectivity is changed to effect the recording of the information.

Since the recorded dot and the track pitch are about 1 $\mu$m, various defects are caused in a manufacturing process of the optical disk (formation of a guide track, manufacturing of a replica disk, evaporation of a recording material, formation of a protective film, and the like), or defects may occur depending on an environment in which the disk is used. Due to such defects of the medium, sometimes a defective sector is detected in which a reproduction error occurs in an address or data. Further, in an information recording and reproducing system wherein rewriting is impossible due to the properties of a recording material as is the case in a write-once type optical disk, if the recording operation is interrupted during data recording, for example, due to a drive error, it results in the recording of incomplete data in a sector, and it is regarded as a defective sector in file management.

A defective sector identification method in a prior art information recording and reproducing system is disclosed, for example, in Japanese Patent Application No. 60-49035 (1985). Further, a method for using an alternative sector for a defective sector is disclosed, for example, in Japanese Patent Laid-Open Publication No. 60-75931 (1985). The operation for using an alternative sector for a defective sector in an information recording and reproducing system will be described with reference to FIG. 5. For example, it is supposed that defective sectors X1 and X2 exist among sectors S1 to S9 on a track T from which data is intended to be reproduced, and that it is recorded in a registor Rg beforehand that alternative sectors are a sector S1' and a sector S2' on a track T'. First, when the reproduction of the data is started with the sector S1, the defective sector X1 located next to the sector S2 is skipped and the sector S4 is accessed. Further, the defective sector X2 located next to the sector S5 is skipped, and this sector S6 and the sectors following thereto are accessed. Next, the track T' is sought to successively reproduce data from the alternate sectors S1' and S2', and the reproduced data is sent to an area in a main memory to which otherwise reproduced data from the defective sectors X1 and X2 would be sent originally.

However, in the aforementioned system for using an alternative sector, it is necessary to provide within the system a register and a buffer to administer a correspondence table indicating a correspondence between a defective sector and an alternative sector, and to provide a table recording area in the information recording area every time a new defective sector is detected. Thus, overhead is increased both in hardware and software. Moreover, in the operation of replacing the defective sector with an alternative sector, a seek operation is required to access the alternative sector existing on a specific track, and the data processing speed is decreased.

DISCLOSURE OF INVENTION

An information recording and reproducing apparatus according to the present invention uses a disk type information recording and reproducing medium including within a same track a normal sector having an address formatted on an address area in a sector ID field, the address being capable of detecting an error, and including an alternative sector having no address formatted, and further, the apparatus is provided with address deleting means for disabling an address in a defective sector to be reproduced, and address recording means for recording an address in an address area in the alternative sector. In this apparatus, when the defective sector is detected, a delete signal is recorded on the address area of the defective sector thereby to disable the address in the defective sector to be reproduced, next, an address which is the same as the defective sector is recorded in an address area in an unused alternative sector on the same track as the defective sector, and further, information to be recorded on the defective sector is recorded on the alternative sector. In the present invention, owing to such an operation for using the alternative sector, the alternative sector having the same address and data is formed on the same track as the defective sector, and thus, an information recording and reproducing apparatus is provided in which a high speed operation for using an alternative sector is made possible without requiring the use of a correspondence table between the defective sector and the alternative sector.

BEST MODE FOR CARRYING OUT THE INVENTION

Figure 1:
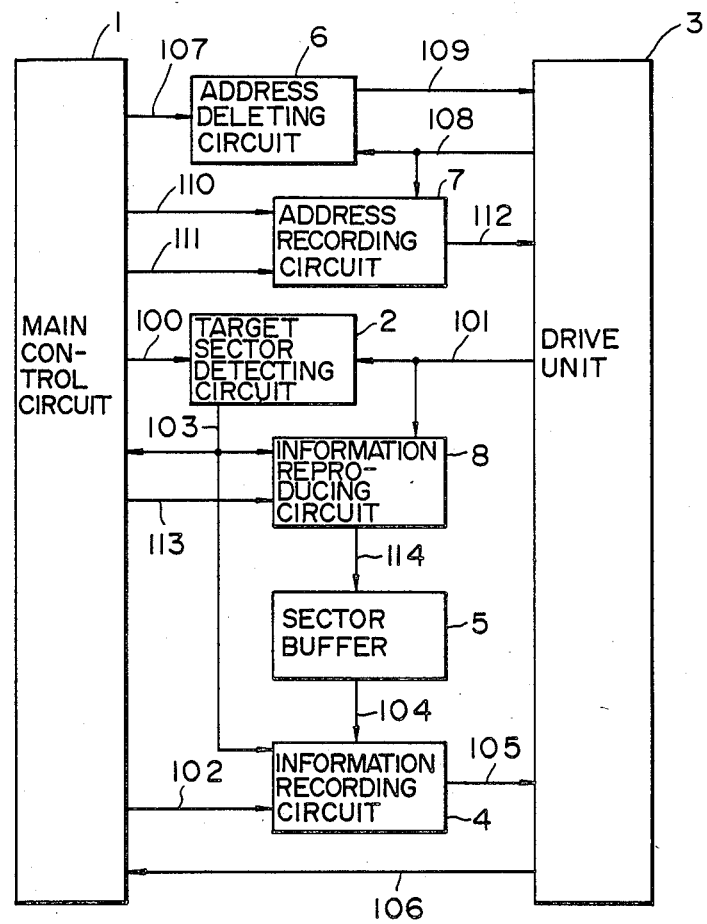
FIG. 1 is a block diagram of an embodiment of an information recording and reproducing apparatus according to the present invention, FIG. 2 (A through D) is an operation outline explaining diagram for explaining an operation for using an alternative sector during data recording.

FIG. 1 is a block diagram of an information recording and reproducing apparatus in an embodiment of the present invention. In FIG. 1, reference numeral 1 designates a main control circuit which controls the whole apparatus by receiving a device command from a host system (not shown). Reference numeral 2 designates a target sector detecting circuit which performs, after reading ID information such as a track address, a sector address, a CRCC code (cyclic redunduncy check code) for error checking, etc., from a reproducing signal 101 delivered from a drive unit 3 and after checking an error wit respect to the CRCC, a coincidence detection with a target sector address 100 set by the main control circuit 1. Reference numeral 5 designates a sector buffer for temporarily storing recording information 104 to be recorded on a target sector and reproduced information 114 reproduced from the target sector. Reference numeral 4 designates an information recording circuit which performs digital modulation of (2, 7) RLLC (run length limited code), etc., after coding the recording information 104 by adding thereto an error detection and correction code such as a reed solomon code, and delivers a produced recording signal 105 to a laser driving circuit (not shown) within the drive unit 3. Reference numeral 8 designates an information reproducing circuit which takes the reproducing signal 101 delivered from the drive unit 3 into a shift register, and produces the reproduced information 114 after demodulating an output of the shift register by converting in a combining circuit and after decoding the demodulated output. Reference numeral 6 designates an address deleting circuit which supplies a delete signal 109 to the drive unit 3, and disables an address from a defective sector to be reproduced by recording the delete signal 109 on an address area in the defective sector by using the laser driving circuit within the drive unit 3. Reference numeral 7 designates an address recording circuit which performs digital modulation after adding the CRCC code for error checking to alternative address information 111, delivers the produced alternative address signal 112 to the drive unit 3, and records on the address area of the alternative sector by using the laser driving circuit within the drive unit 3. In this respect, a method for modulating and demodulating the (2, 7) RLLC is disclosed in U.S. Pat. No. 4,115,768 issued to Eggenber et al.

Figure 2:
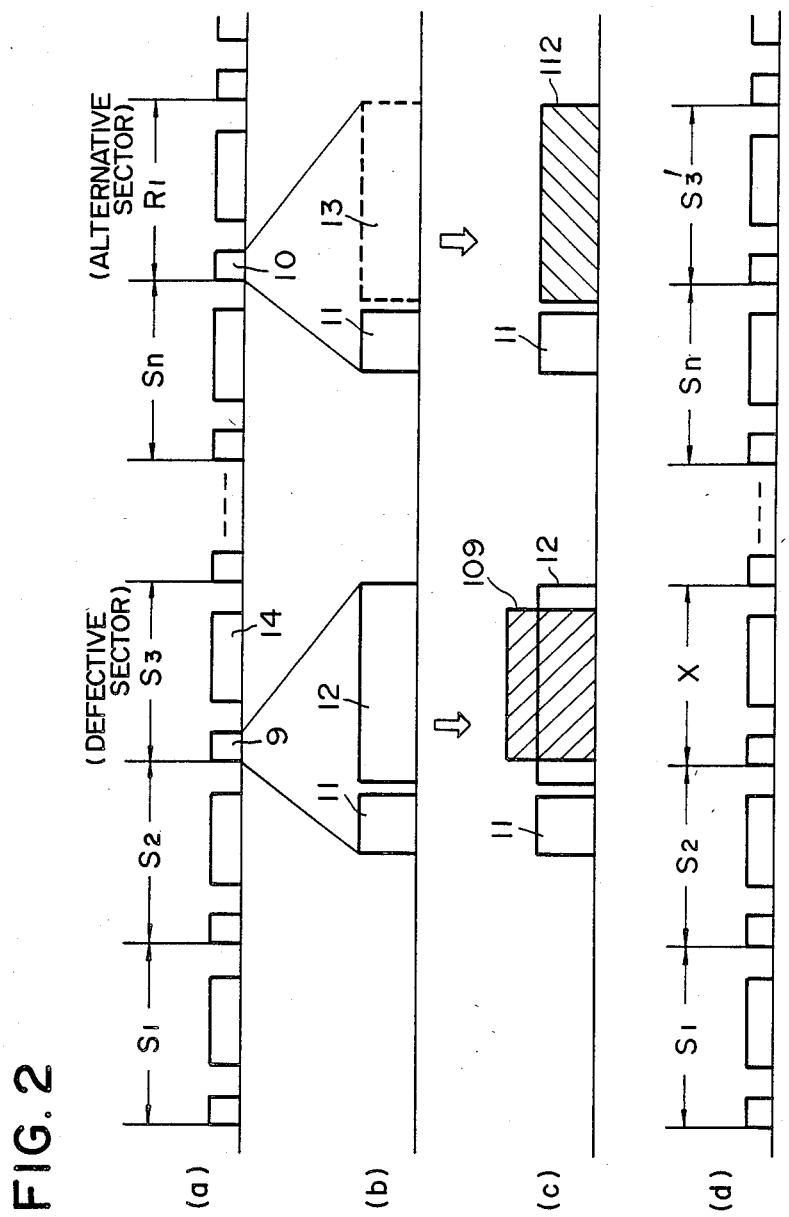
Figure 3:
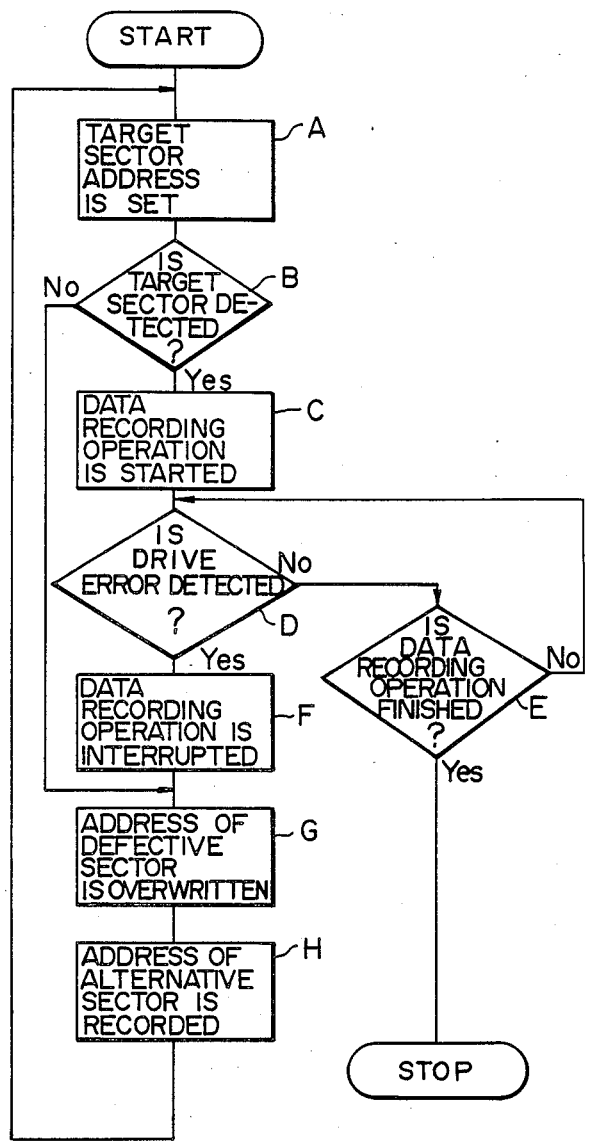
FIG. 3 is a flowchart for explaining a data recording operation.

The operation of the information recording and reproducing apparatus in the embodiment arranged as described in the foregoing will be described with reference to an operation outline explaining diagram in FIG. 2 and a flowchart in FIG. 3. In this embodiment, an information recording medium wherein the rewriting is impossible as in a write-once type optical disk is used, and a seek operation is omitted in order to simplify the explanation. Further, it is supposed that a head has already been existing on a target track. On the target track, as shown in FIG. 2, at (a), there are existing normal sectors S1 to Sn and a first alternative sector R1. In a sector ID field 9 in each of the normal sectors, and in a sector ID field 10 in the alternative sector, similarly in both cases as shown in FIG. 2, at (b), there are recorded with sector marks 11 in a format at the beginning of each of the sector ID fields. Further, although an address having an error detecting capability is recorded in a format on an address area 12 in each of the normal sectors, no recording is made on an address area 13 in the alternative sector. The operation described in the flowchart in FIG. 3 indicates that when a drive error occurs during data recording operation on a data field 14 in the normal sector S3, the data recording operation will be interrupted and incomplete data will be recorded in the normal sector S3. Since, rewriting in the normal sector S3 is impossible, the normal sector S3 is regarded as a defective sector, and the information which is to be recorded at this time is recorded alternatively on the unused alternative sector R1.

(A) The main control circuit 1 delivers and sets the target sector address 100 to the target sector detecting circuit 2, and at the same time, delivers the write enable signal 102 to the information recording circuit 4.

(B) The target sector detecting circuit 2 detects address information contained in the reproducing signal 101, and performs coincidence detection with the target sector address 100 set by the main control circuit 1.

(C) When the target sector S3 is detected in the operation in (B), the target sector detecting circuit 2 delivers the detection signal 103 to the information recording circuit 4. The information recording circuit 4 produces the recording signal 105 from the recording information 104 which has been supplied from the host system and stored temporarily in the sector buffer 5, and starts recording of data by delivering the produced recording signal 105 to the drive unit 3.

(D) During the data recording operation, the drive unit 3 performs detection of a drive error.

(E) The recording operation of data is finished by completing the sending of the recording signal 105 to the target sector S3 by the information recording circuit 4.

(F) When the drive error is detected in the operation in (D), the main control circuit 1 detects as an interrupt signal the drive error signal 106 delivered from the drive unit 3, and stops sending of the write enable signal 102. As a result, the information recording circuit 4 stops sending of the recording signal 105, and the data recording operation is interrupted.

(G) When the data recording operation is interrupted, since the information recording medium is unable to be rewritten, the normal sector S3 in which incomplete data has been recorded is regarded as a defective sector. The main control circuit 1, in order to detect a normal sector S2 which is located precedent to the defective sector S3, sends and sets an address of the normal sector S2 as the target sector address 100 to the target sector detecting circuit 2. When the target sector detecting circuit 2 detects the normal sector S2 set by the main control circuit 1, delivers the detection signal 103 to the main control circuit 1, and the main control circuit 1 delivers a delete enable signal 107 to the address delete circuit 6. When the drive unit 3 delivers a sector mark signal 108 after detecting the sector mark of the defective sector S3, the address delete circuit 6 is actuated and delivers the delete signal 109. The drive unit 3 overwrites the delete signal 109 on the address area 12 in the defective sector S3 as shown in FIG. 2, at (C) thereby to make the address of the defective sect S3 unable to be reproduced.

Further, in the operation in (B), when the target sector can not be detected within a maximum rotational latency (that is, when there is a defect in the address area in the target sector, etc.), the normal sector S3 is regarded as a defective sector having a defect in the address area. In order to prevent erroneous detection of the target sector thereafter due to unsatisfactory address reproduction, in accordance with a procedure similar to that described above, the delete signal 109 is overwritten on the address area 12 in the defective sector S3 is thereby to make the address of the defective sector S3 completely unreproducable.

(H) The main control circuit 1, in order to detect a normal sector Sn located precedent to the alternative sector R1, sends and sets the address of the normal sector Sn to the target sector detecting circuit 2 as the target sector address 100. When the target sector detecting circuit 2 detects the normal sector Sn set by the main control circuit 1, the target sector detecting circuit 2 delivers the detection signal 103 to the main control circuit 1, and the main control circuit 1 delivers to the address recording circuit 7 the address write enable signal 110 and the alternative address information 111 containing the address of the defective sector S3. Then, when the drive unit 3 detects the sector mark of the alternative sector R1 and sends the sector mark signal 108, the address recording circuit 7 is actuated, and the address recording circuit 7 produces the alternative address signal 112 from the alternative address information 111 and delivers the alternative address signal 112 to the drive unit 3. The drive unit 3 records the alternative address signal 112 on the address area 13 in the alternative sector R1 as shown in FIG. 2, at (C), and by this recording, the same address as the defective sector S3 is recorded on the address area 13 in the alternative sector R1 which has been in an unrecorded condition.

By the procedure as described above, the disposition of the sectors on the target track is changed as shown in FIG. 2, at (D), and because of the fact that the address of the normal sector S3 is disabled to be reproduced, the normal sector S3 is identified as a defective sector X and also, the alternative sector R1 is identified as an alternative sector S3' which has the same address as the normal sector S3. Thus, the information which is to be recorded on the normal sector S3 is recorded alternatively on the alternative sector S3', and the operation for the alternative sector is completed.

Further, in the recording of the delete signal 109 in the aforementioned procedure (G), when the address area of the information recording medium is formed with an irregular surface structure of the disk substrate as is the case in the write-once type optical disk, or when the rewriting of address information is impossible due to the properties of the recording material, it is possible to disable the address of the defective sector to be reproduced by using as the delete signal 109, for example, a signal having a pulse width wider than the signal contained in the signal 112 of the alternative address, and by overwriting the signal of the wider pulse width on the address area of the defective sector thereby to cause the CRCC error to be generated at the time of reproducing the address. Further, when the information recording medium is used in which the rewriting of the address information is possible, it is possible to disable the address of the defective sector to be reproduced, for example, by using as the delete signal 109 a D.C. signal thereby to erase at least a portion of the address area.

Next, in this embodiment, the reproducing operation of information recorded alternatively on the alternative sector S3' will be described with reference to the block diagram in FIG. 1.

First, the main control circuit 1 delivers and sets as the target address 100 the address of the normal sector S3 to the target sector detecting circuit 2, and at the same time, delivers the read enable signal 113 to the information reproducing circuit 8. The target sector detecting circuit 2 detects address information contained in the reproducing signal 101 and performs coincidence detection with the target sector address 100. When the target sector detecting circuit 2 detects, in place of the defective sector S3 whose address has been disabled from reproduction, the alternative sector S3' having the same address recorded therein, the target sector detecting circuit 2 delivers the detection signal 103 to the information reproducing circuit 8. The information reproducing circuit 8 produces the reproduced information 114 from the reproducing signal 101 sent from the drive unit 3, and delivers it to the sector buffer 5. When the information reproducing circuit 8 finishes the delivery of the reproduced information 114, the reproducing operation is completed when the reproduced information 114 which is stored temporarily in the sector buffer 5 is sent out to the host system.

In the above embodiment, although one alternative sector exists on the target track, the number of the alternative sectors is not limited to one. Further, when a plurality of alternative sectors exist on the same track, the foregoing procedure for alternative sector can be executed also for the alternative sector which is regarded as a defective sector.

Figure 4:
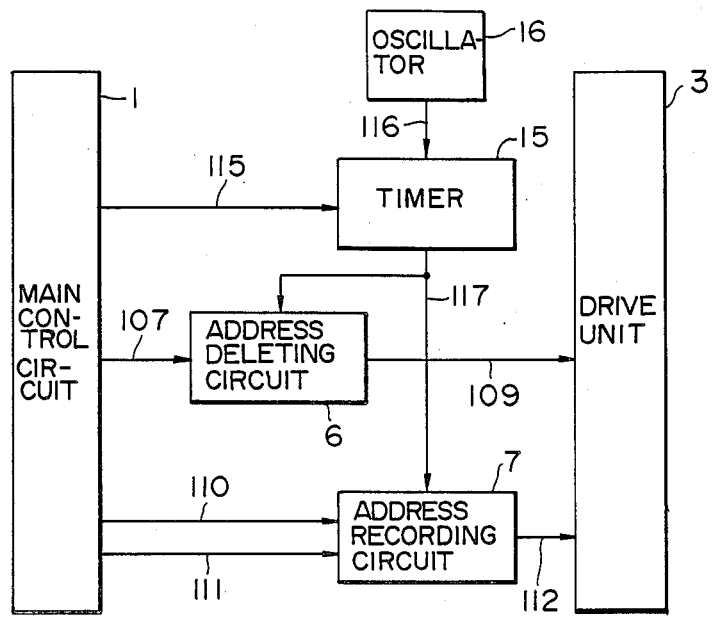
FIG. 4 is a block diagram of address deleting means and address recording means which are actuated by using a timer, and FIG. 5 an operation outline explaining diagram for explaining a prior art operation for using an alternative sector.
Figure 5:
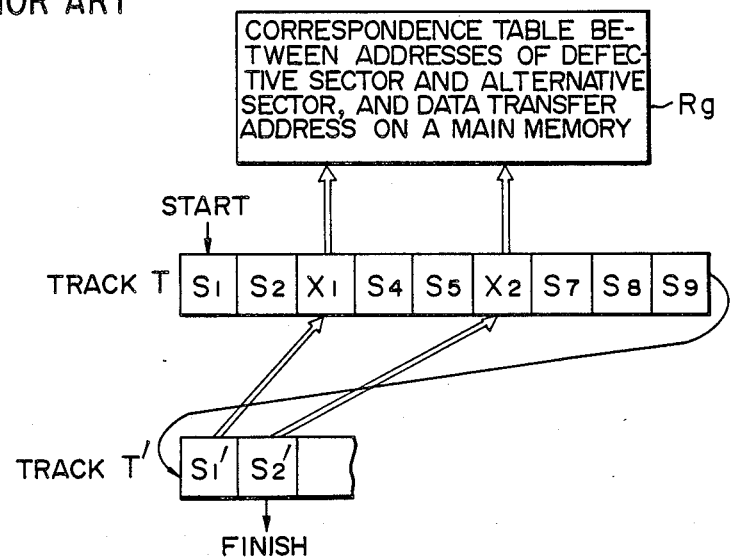

Further, in the above embodiment, the address deleting circuit 6 and the address recording circuit 7 are actuated by the sector mark signal 108 which is sent out when the drive unit 3 detects the sector mark 11. However, when the sector mark 11 is not satisfactory or when the format recording has not been performed, the foregoing operation for alternative sector can not be executed. In such a case, a method for actuating the address deleting circuit 6 or the address recording circuit 7 uses a timer for measuring a rotational latency corresponding to one sector in place of the sector mark signal 108. This method will be described with reference to a block diagram in FIG. 4. In FIG. 4, when a sector existing precedent to the defective sector or the alternative sector is detected, the main control circuit 1 delivers measurement data 115 corresponding to a rotational latency corresponding to one sector to actuate a timer 15. The timer 1 measures a time corresponding to the measurement data 115 by counting a clock signal 116 delivered from an oscillator 16. At the time point at which the measurement of the rotational latency corresponding to one sector is finished, the timer 15 sends an alternative actuation signal 117 to the address deleting circuit 6 or the address recording circuit 7. By such a procedure, the address deleting circuit 6 or the address recording circuit 7 is actuated by the alternative actuation signal 117 in place of the sector mark signal 108, and the operation for alternative sector can be executed.

As described in the foregoing, in the information recording and reproducing apparatus in accordance with the present invention, when a defective sector is detected, first, the address of the defective sector is made impossible to be reproduced by recording a delete signal on the address area in the defective sector, then, the address of the defective sector is recorded on the address area in an alternative sector, and further, the information to be recorded on the defective sector is recorded within the alternative sector. By such an operation for alternative sector, the alternative sector having the same address and data as the defective sector is formed on the same track as the defective sector. Accordingly, at the time of reproduction, the access to the alternative sector becomes possible without a seek operation, and the processing speed is increased. Moreover, since the access to the alternative sector is enabled without using a correspondence table between the defective sector and the alternative sector, the structure of the apparatus can be made simple, and its practical effects are great.

INDUSTRIAL APPLICABILITY

The information recording and reproducing apparatus according to the present invention uses an information recording medium including on the same track a normal sector having an address formatted on an address area within a sector ID field, and an alternative sector in which an address is not yet recorded. In the, apparatus, when a defective sector is detected, first, reproduction of the address of the defective sector is made impossible by recording a delete signal on the address area in the defective sector, then, the address of the defective sector is recorded on the address area in the alternative sector, and further the information to be recorded on the defective sector is recorded within the alternative sector. As a result, the alternative sector having the same address and data as the defective sector is formed on the same track as the defective sector. Accordingly, at the time of reproduction, the seek operation for accessing the alternative sector is not needed, and the processing speed is increased. Moreover, since the correspondence table between the defective sector and the alternative sector, etc., are not used, there is no need to provide a register and a buffer for administering the correspondence table, and the structure of the apparatus can be made simple.

We claim:

1. An information recording and reproducing apparatus for use with a disk type information recording medium having a plurality of tracks divided into a plurality of sectors and including tracks having (a) a plurality of normal sectors in which an address is recorded in an address area in a sector ID field thereof and, (b) on the same track, at least one alternative sector in which an address has not been recorded in an address area in a sector ID field thereof; said apparatus comprising:
    information recording means for recording data on a data field in a sector;
    address deleting means for measuring a disk rotational period taken to an address area of a defective sector from a sector located precedent to said defective sector and for recording a delete signal on the address area of said defective sector to disable reproduction of the address area of said defective sector; and
    address recording means responsive to detection of said defective sector for recording the address of said defective sector on the address area of an unused alternative sect or located on the same tract as the defective sector;
    said information recording means recording information designated for the defective sector within that alternative sector having an address area thereof recorded with the address of the defective sector.

2. An information recording and reproducing apparatus for use with a disk type information recording medium having a plurality of tracks divided into a plurality of sectors and including tracks having (a) a plurality of normal sectors in which an address is recorded in an address area in a sector ID field thereof and, (b) on the same track, at least one alternative sector in which an address has not been recorded in an address area in a sector ID field thereof; said apparatus comprising:
    information recording means for recording data on a data field in a sector;
    address deleting means for recording a delete signal on the address area of a detected defective sector to disable reproduction of the address area of said defective sector; and
    address recording means for measuring a disk rotational period taken to the address area of the defective sector from a sector located precedent to said defective sector and for thereafter recording the address of said defective sector on the address area of an unused alternative sector located on the same track as the defective sector;
    said information recording means recording information designated for the defective sector within that alternative sector having an address area thereof recorded with the address of the defective sector.

* * * * *